United States Patent [19]

Smith et al.

[11] Patent Number: 5,023,137

[45] Date of Patent: Jun. 11, 1991

[54] POLYESTER COMPOSITION WHICH IS PARTICULARLY SUITABLE FOR USE IN THERMOFORMING DUAL-OVENABLE TRAYS

[75] Inventors: Richard R. Smith, Cuyahoga Falls; Walter F. Johnston, Tallmadge, both of Ohio

[73] Assignee: The Goodyear Tire & Rubber Company, Akron, Ohio

[21] Appl. No.: 329,033

[22] Filed: Mar. 27, 1989

[51] Int. Cl.$^5$ .............................................. B32B 1/08
[52] U.S. Cl. .................................. 428/34.1; 428/35.7; 428/36.92; 428/480; 428/500; 426/234; 525/177
[58] Field of Search .................... 428/480, 35.7, 36.92, 428/34.1, 500; 525/177; 426/234

[56] References Cited

U.S. PATENT DOCUMENTS 4,572,852  2/1986  Gartland et al. .................... 428/480
4,740,377  4/1988  Dawes et al. ...................... 426/234

Primary Examiner—P. C. Sluby
Assistant Examiner—Don Sumihiro
Attorney, Agent, or Firm—Alvin T. Rockhill

[57] ABSTRACT

This invention relates to a thermoplastic resin composition which is particularly suitable for use in thermoforming thin walled articles, such as dual-ovenable trays. Articles which are made utilizing this thermoplastic resin composition have improved low temperature impact strength. These thermoplastic resin compositions are comprised of (a) from about 92 to about 99 weight percent polyethylene terephthalate having an intrinsic viscosity of from at least about 0.7 dl/g; (b) from about 1 to about 8 weight percent of a polyethylene ionomer; and (c) optionally an effective amount of a heat stabilizer. The subject invention also deals with thermoforming such thermoplastic resin compositions into thin walled articles having a crystallinity within the range of about 10% to about 40%.

16 Claims, No Drawings

POLYESTER COMPOSITION WHICH IS PARTICULARLY SUITABLE FOR USE IN THERMOFORMING DUAL-OVENABLE TRAYS

BACKGROUND OF THE INVENTION

The wide spread popularity of microwave ovens for home use has initiated interest in food trays which can be used in either microwave ovens or convection ovens. Such food trays must be able to withstand oven temperatures which approach 200° C. Such trays are of particular value as containers for frozen prepared foods. It is accordingly necessary for such trays to have good impact strength at freezer temperatures and dimensional stability at oven temperatures. It is, of course, also important for such trays to be capable of withstanding rapid heating from freezer temperatures of about −30° C. to oven temperatures of about 175° C. or even higher.

Containers which are capable of being heated in either convection ovens or microwave ovens are sometimes described as being dual-ovenable. Polyesters are highly suitable for use in making such dual-ovenable containers. However, it is important for the polyester to be in the crystalline state rather than the amorphous state in order to achieve satisfactory high temperature stability. Normally, polyesters will undergo crystallization by heat treatment at elevated temperatures and the crystallites formed will remain substantially stable up to near the melting point of the polyester. As a general rule, dual-ovenable containers which are comprised of polyester will be heat treated to attain a crystallinity of higher than about 25%.

Injection molding and thermoforming are widely known methods for forming thermoplastic polyester articles. In injection molding, the polyester is heated above its melting point and injected under sufficient pressure to force the molten polyester to fill the mold cavity The molten polyester is cooled in the mold until it is rigid enough to be removed. The injection molding of a polyester composition containing 0.5% to 10% by weight isotactic polybutene-1 is described in U.S. Pat. No. 3,839,499. However, the injection molding method is generally not satisfactory for the production of thin walled articles, such as dual-ovenable trays, due to flow lines and layering which develop during the filling of the mold which lead to non-uniform properties, surface irregularities, and warping of the finished article. Very high filling pressures are also required in the injection molding of thin walled articles due to high melt viscosities.

Thermoforming is another process which is used commercially in the production of polyester articles. It is a particularly valuable technique for use in producing thin walled articles, such as dual-ovenable food trays, on a commercial basis. In thermoforming, a preformed polyester sheet is preheated to a temperature sufficient to allow the deformation of the sheet. The sheet is then made to conform to the contours of a mold by such means as vacuum assist, air pressure assist, or matched mold assist. The thermoformed article produced is normally heat treated in the mold in order to attain a crystallinity of at least about 25%.

Crystallization rates can generally be improved by including a small amount of a nucleating agent in polyester compositions. For example, U.S. Pat. No. 3,960,807 discloses a process for thermoforming articles from a polyester composition which is comprised of (1) a crystallizable polyester, (2) a crack stopping agent, preferably a polyolefin, and (3) a nucleating agent. Polyester articles which are made utilizing such compositions generally have improved mold release characteristics and improved impact strength. Additionally, the utilization of such modified polyester compositions results in faster thermoforming cycle times due to the faster rate of crystallization which is attained.

U.S. Pat. No. 4,572,852 discloses a polyester molding composition which consists of (1) polyethylene terephthalate, (2) a polyolefin containing from 2 to 6 carbon atoms, and (3) an effective amount of a heat stabilizer. Thin walled thermoformed articles which are prepared utilizing such compositions exhibit improved impact strength and high temperature stability. For this reason dual-ovenable trays which are comprised of polyester/polyolefin blends are widely utilized commercially. Polyethylene terephthalate having an intrinsic viscosity of at least about 0.65 is widely utilized in such applications. It is important for the polyethylene terephthalate used in dual-ovenable trays to have an intrinsic viscosity of at least about 0.65 dl/g in order for the article to have acceptable impact strength at low temperatures, such as those experienced in a freezer.

It would be desirable to improve the low temperature impact strength of dual-ovenable trays. This is because a certain amount of tray breakage occurs during transporting of frozen prepared foods which are packed utilizing such trays. Such trays have also been known to break upon being dropped after taking them out of home freezers. Thus, it would be highly beneficial to manufacture dual-ovenable trays utilizing a material which provides improved low temperature impact strength.

SUMMARY OF THE INVENTION

It has been unexpectedly found that polyethylene terephthalate/polyethylene ionomer blends offer an outstanding combination of properties, including improved low temperature impact strength, for utilization in thermoforming heat set, thin walled articles such as dual-ovenable trays. The subject invention accordingly relates to a thermoformed, non-oriented, heat set, thin walled article, comprising: (a) from about 92 to about 99 weight percent polyethylene terephthalate having an intrinsic viscosity of at least about 0.7 dl/g as measured in a 60:40 phenol/tetrachloroethane mixed solvent system at 30° C.; and (b) from about 1 to about 8 weight percent of a polyethylene ionomer having a melt flow index as measured using ASTM Method D-1238 of less than about 2 g/10 minutes; said article having a total crystallinity of from about 10% to about 40%.

The present invention further reveals a process for making a heat set, partially crystalline, thin walled article which comprises thermoforming a substantially amorphous sheet which is comprised of (a) from about 92 to about 99 weight percent polyethylene terephthalate having an intrinsic viscosity of at least about 0.7 dl/g as measured in a 60:40 phenol/tetrachloroethane mixed solvent system at 30° C.: and (b) from about 1 to about 8 weight percent of a polyethylene ionomer having a melt flow index as measured using ASTM Method D-1238 of less than 2 g/10 minutes; wherein the thermoforming is carried out in a heated mold for a time sufficient to achieve a crystallinity in said article which is within the range of about 10% to about 40%.

DETAILED DESCRIPTION OF THE INVENTION

The thermoplastic resin compositions of this invention are comprised of polyethylene terephthalate (PET) and at least one polyethylene ionomer. Such compositions will normally contain from about 92 to about 99 weight percent PET and from about 1 to about 8 weight percent polyethylene ionomer. It is generally preferred for the thermoplastic resin compositions of this invention to contain from about 94 to about 98.5 weight percent PET and from about 1.5 to about 6 weight percent polyethylene ionomer with the most preferred compositions containing from about 2 to about 4 weight percent polyethylene ionomer and from about 96 to about 98 weight percent PET.

PET is comprised of repeat units which are derived from terephthalic acid or a diester thereof and ethylene glycol. The PET utilized in the thermoplastic resin compositions of this invention can be a modified PET. Such modified PET can contain small amounts of repeat units which are derived from diacids other than terephthalic acid and/or glycols in addition to ethylene glycol. For instance, small amounts of isophthalic acid or a naphthalene dicarboxylic acid can be used in the diacid component utilized in preparing the PET. PET which has been modified with a small amount of a diol containing from 3 to 8 carbon atoms is also representative of a modified PET which can be used. For instance, a small amount of 1,4-butane diol can be utilized in the glycol component used in preparing the modified PET. Normally, no more than about 5 weight percent of the repeat units in such modified PET will be comprised of diacids or diols other than a terephthalic acid and ethylene glycol. It is, of course, contemplated that diesters of such dicarboxylic acids and diols can also be used In most cases, such modified PET will contain less than about 3% diacids other than terephthalic acid and less than 3% diols other than ethylene glycol. It will normally be preferred for such modified polyesters to contain only about 1% dicarboxylic acids other than terephthalic acid and/or less than 1% glycols other than ethylene glycol. In any case PET homopolymer is an excellent choice for utilization in the thermoplastic resin compositions of this invention.

The PET utilized in the thermoplastic resin compositions of this invention will normally have an intrinsic viscosity (I.V.) of at least about 0.7 dl/g. In most cases, the PET will have an I.V. which is within the range of about 0.8 dl/g to about 1.4 dl/g. It is generally preferred for the PET to have an intrinsic viscosity of at least 0.9 dl/g with it being more preferred for the PET to have an intrinsic viscosity of about 0.95 dl/g. Intrinsic viscosity is defined as the limit of the fraction in (v)/C as C, the concentration of the polymer solution, approaches 0, wherein v is the relative viscosity which is measured at several different concentrations in a 60/40 mixed solvent of phenol and tetrachloroethane at 30° C.

The polyethylene ionomers which can be utilized in the practice of this invention are generally copolymers of ethylene and at least one $\alpha,\beta$-ethylenically unsaturated carboxylic acid wherein from about 5 percent to about 90 percent of the carboxylic acid groups are ionized by neutralization with metal ions. The $\alpha,\beta$-ethylenically unsaturated carboxylic acid can be a monocarboxylic acid, or have more than one carboxylic group attached to it. The carboxylic acid groups are neutralized with at least one cation from the group consisting of metallic cations having a valence of 1 to 3. The polyethylene ionomers used in this invention will have a melt flow index as measured using ASTM Method D-1238 after being dried for 16 hours in a vacuum oven at 63° C. of less than about 2 g/10 minutes. It is preferred for the polyethylene ionomer to have a melt flow index of less than about 1.5 g/10 minutes with it being most preferred for the polyethylene ionomer to have a melt flow index of less than about 1.2 g/10 minutes.

The $\alpha,\beta$-ethylenically unsaturated carboxylic acids which can be copolymerized with the ethylene monomer preferably have 3 to 8 carbon atoms. Examples of such acids include acrylic acid, methacrylic acid, ethacrylic acid, itaconic acid, maleic acid, fumaric acid and monoesters of other dicarboxylic acids, such as methyl hydrogen maleate, methyl hydrogen fumarate, ethyl hydrogen fumarate, and maleic anhydride, which is considered to behave like an acid and be an acid in the present invention.

The polyethylene ionomer will generally contain from about 2 to about 40 weight percent $\alpha,\beta$-ethylenically unsaturated carboxylic acids and from about 60 to about 98 weight percent ethylene. The polyethylene ionomer will more typically contain from about 3 to about 20 weight percent $\alpha,\beta$-ethylenically unsaturated carboxylic acids and from about 80 to about 97 weight percent ethylene.

A preferred polyethylene ionomer is a copolymer of ethylene and an $\alpha,\beta$-ethylenically unsaturated monocarboxylic acid having 3 to 6 carbon atoms. A most preferred $\alpha,\beta$-ethylenically unsaturated monocarboxylic acid is acrylic acid. Methacrylic acid is another highly preferred $\alpha,\beta$-ethylenically unsaturated monocarboxylic acid.

The polyethylene ionomers used in this invention will normally have an impact strength as measured at 23° C. using ASTM Method D-1822S of at least 1100 KJ/m². It is preferred for the polyethylene ionomer to have an impact strength of at least 1150 KJ/m² with it being most preferred for the polyethylene ionomer to have an impact strength of at least 1200 KJ/m².

U.S. Pat. No. 4,248,990, which is incorporated herein by reference, discloses polyethylene ionomers and a process for making polyethylene ionomers in greater detail. Polyethylene ionomers which can be used in the practice of this invention are commercially available from E. I. du Pont de Nemours & Company, Inc. and are sold under the tradename Surlyn ®. For example, Surlyn ®1605 is a polyethylene ionomer which contains approximately 10% acrylic acid and approximately 5% sodium acrylate. Surlyn ®9721 is a polyethylene ionomer which contains ethylene and methacrylic acid.

The thermoplastic resin composition of this invention will preferably contain one or more heat stabilizers. The inclusion of one or more heat stabilizers has particular utility when the finished article being made from the resin will be subjected to high service temperature conditions for long periods of time. The retention of adequate physical properties, especially impact strength, is very important in applications such as food trays for use in dual-ovenable applications. Heat stabilizers as used herein are compounds which demonstrate antioxidant properties, the most important of which is the capacity of inhibiting oxidation. An effective heat stabilizer in the practice of this invention must be capable of protecting the thermoformed article during exposure to elevated temperatures. The following compounds are representative examples of useful heat stabilizers which can be incorporated into the thermoplastic resin compositions of this invention: alkylated substituted phenols, bisphenols, thiobisacrylates, aromatic amines, organic phosphites, and polyphosphites. The particular aromatic amines which demonstrate specific heat stabilizing capabilities include: primary polyamines, diarylamines, bisdiarylamines, alkylated diarylamines, ketone-diarylamine condensation products, aldehyde-amine condensation products, and aldehyde imines. Conditions which would be considered severe would be those in which the thermoformed article would be exposed to temperatures near 200° C. for periods exceeding about 30 minutes. Preferred heat stabilizers for such severe high temperature applications, particularly where any staining or discoloration from the heat stabilizer is undesirable, are the polyphenols which contain more than two phenol ring structures. Some representative examples of suitable polyphenols include tetrakis(methylene-3(3,5-di-t-butyl-4-hydroxy phenyl)proprionate)methane and 1,3,5-trimethyl-2,4,6-tris(3,5-di-t-butyl-4-hydroxybenzyl)benzene.

Persons skilled in the art will be able to easily ascertain the effective amount of heat stabilizer needed, with this amount generally being within the range of about 0.005 to about 2% by weight based upon the total weight of the thermoplastic resin composition. It will normally be preferred for the amount of heat stabilizer utilized to be within the range of 0.01 to 0.5% by weight, based upon the total weight of the thermoplastic resin composition. The amount of heat stabilizer used will vary with such factors as the degree of protection required, the severity of heat exposure, solubility limitations of the heat stabilizer chosen in the thermoplastic resin composition, and the overall effectiveness of the heat stabilizer.

One or more pigments or colorants can also be added to the thermoplastic resin composition in order to provide it with a desired color. For instance, titanium dioxide can be included in the thermoplastic resin composition in order to provide it with a brilliant white color. One or more colorants can also be added to the thermoplastic resin composition in order to provide it with any of a multitude of colors. Such colorants will normally not act as nucleating agents. Some representative examples of non-nucleating organic colorants include: phthalocyanine blue, solvent red 135, and disperse yellow 64 (CAS No. 10319-14-9). Many other dyes of the solvent and disperse groups are also useful for coloring the thermoplastic resin compositions of this invention. The amount of colorant or combination of colorants needed to obtain a specific desired color can be easily ascertained by persons skilled in the art.

The thermoplastic resin compositions of this invention can be prepared by simply melt blending the PET with the polyethylene ionomer, the heat stabilizer and optionally a colorant. Such melt blending is done at a temperature at which the PET is in the liquid state. PET homopolymer has a melting point of about 260° C. Since such a melt blending procedure must be carried out above the melting point of the PET, it will normally be done at a temperature within the range of about 260° C. to 350° C. Normally, it is preferred for the melt blending procedure to be carried out at a temperature within the range of about 280° C. to 320° C. In such a melt blending procedure, the polyethylene ionomer is simply dispersed throughout the molten PET. Sufficient mixing action will be applied so as to result in the formation of a homogeneous system. In other words, the polyethylene ionomer and heat stabilizers or colorants added should be uniformly dispersed throughout the PET in order to produce optimal thermoplastic resin compositions. Such a melt blending procedure can commercially be carried out in extruders which provide sufficient shearing forces so as to result in adequate mixing.

After the thermoplastic resin compositions of this invention have been prepared, they can be utilized in making a wide variety of useful articles of manufacture. The thermoplastic resin compositions of this invention have particular value for use as thermoforming compositions from which thin walled articles such as dual-ovenable trays can be made. The articles of manufacture to which this invention relates are thin walled thermoformed articles. Thin walled as used herein means articles having wall thicknesses of less than about 1 mm.

Since a partially crystalline finished article is necessary for good dimensional stability at high temperatures, knowledge of the degree of crystallinity or percent of crystallinity is of considerable importance. Density is a convenient method of determining the percent of crystallinity since there is a direct relationship between the two for a given polyester composition. A calibrated gradient column can be used for determining density at a particular temperature. The density value can then be converted into a percent of crystallinity.

The terms crystallization temperature and crystallization onset are used interchangeably to mean the temperature or temperature range in which a regularly repeating morphology, brought about by a combination of molecular mobility and secondary bonding forces, is induced in a polymer over a molecular distance of at least several hundred angstroms. The crystallization temperature or crystallization onset can be visually observed as the point at which a substantially amorphous, unoriented sheet of PET/polyethylene ionomer changes from a translucent, hazy appearance to a white appearance.

As used throughout this specification and the appended claims, the term glass transition temperature means that temperature or temperature range at which a change in slope appears in the volume versus temperature curve for said polymer and defining a temperature region below which the polymer exhibits a glassy characteristic and above which the polymer exhibits a rubbery characteristic. The glass transition temperature (Tg) of polyethylene terephthalate is about 70° C.

Another aspect of this invention relates to a process for producing heat set, thin-walled articles from the thermoplastic resin compositions of this invention using conventional thermoforming equipment. The complete technique consists of the following steps:

1. Forming a substantially amorphous sheet from the homogeneously blended PET/polyethylene ionomer composition.

2. Preheating the sheet until it softens and positioning it over the mold.

3. Drawing the preheated sheet onto the heated mold surface.

4. Heatsetting the formed sheet by maintaining sheet contact against the heated mold for a sufficient time period to partially crystallize the sheet.

5. Stripping the part out of the mold cavity.

The sheeting and film for use in the thermoforming process can be made by any conventional method. The most common method being by extrusion through a flat die. It is important that the sheet or film be quenched immediately after extrusion in order to minimize the extent of crystallization developed after forming.

The term substantially amorphous as used herein shall mean a sheet having a level of crystallinity low enough to enable thermoforming of the sheet to be accomplished with satisfactory mold definition and part formation. In currently available thermoforming processes, the level of crystallinity of the preformed sheet should not exceed about 10 percent.

The preheating of the substantially amorphous sheet prior to positioning over the thermoforming mold is necessary in order to achieve the very short molding times required for a viable commercial process. The sheet must be heated above its Tg and below the point at which it sags excessively during positioning over the mold cavity. In the thermoforming process, a sheet temperature which is within the range of about 130° C. to about 210° C. and a mold temperature which is within the range of about 140° C. to about 220° C. will normally be utilized. It is often preferred to use a sheet temperature which is within the range of about 155° C. to about 185° C. and a mold temperature which is within the range of about 165° C. to about 195° C.

This invention can be practiced by using any of the known thermoforming methods including vacuum assist, air assist, mechanical plug assist or matched mold. The mold should be preheated to a temperature sufficient to achieve the degree of crystallinity desired. Selection of the optimum mold temperature is dependent upon the type of thermoforming equipment, configuration and wall thickness of the article being molded and other factors.

Heatsetting is a term describing the process of thermally inducing partial crystallization of a polyester article without appreciable orientation being present. In the practice of this invention, heatsetting is achieved by maintaining intimate contact of the film or sheet with the heated mold surface for a sufficient time to achieve a level of crystallinity which gives adequate physical properties to the finished part. It has been found that desirable levels of crystallinity should be about 10 to about 40 percent. For containers to be used in high temperature food application, it was found that levels of crystallinity above 15 percent were necessary for adequate dimensional stability during demolding operations. A preferred range of crystallinity is from 25 to 35 percent, this range yields parts with excellent dimensional stability and impact resistance.

The heat set part can be stripped out of the mold cavity by known means for removal. One method, blow back, involves breaking the vacuum established between the mold and the formed sheet by the introduction of compressed air. In commercial thermoforming operation, the part is subsequently trimmed and the scrap ground and recycled.

In the preparation of films or sheeting for subsequent use in thermoforming processes, it is extremely important that the polyethylene ionomer be homogeneously dispersed throughout the PET to form a homogeneous blend in order to achieve optimum results. The film can be produced by conventional extrusion or casting methods. Depending upon the method employed in making the film or sheeting, the intrinsic viscosity of the film or sheeting produced may be nearly the same or slightly lower than the intrinsic viscosity of the starting thermoplastic resin composition. In other words, the intrinsic viscosity of the thermoplastic resin composition may be reduced slightly by the casting or extrusion process. The thermoformed articles made should have intrinsic viscosities which are similar to the intrinsic viscosities of the film or sheeting from which they are made.

Throughout the specification and appended claims, all percent expressions are weight percent based on the total weight of the composition polymer, sheet or article. The following examples are intended to be illustrative of the invention rather than limiting its scope.

EXAMPLE 1

A PET resin having an I.V. of 1.04 dl/g was extruder blended with Surlyn ®9721 (a polyethylene ionomer). The thermoplastic resin composition made contained about 96.6% PET and 2.4% polyethylene ionomer. The resin was extruded utilizing a 1.75 inch (4.45cm) extruder which was operated at a temperature within the range of about 285° C. to about 305° C. utilizing an extruder speed of 70 rpm and a die temperature of about 292° C. The extruder screw produced sufficient shearing force to homogeneously blend the polyethylene ionomer into the PET. Sheeting having a thickness of 0.03 inches (0.076cm) was prepared utilizing a chill roll temperature of about 63° C. and a take up speed of 4 feet/minute (121.9 cm/minutes).

The sheeting prepared was thermoformed into trays utilizing a standard thermoformer. The thermoforming process was carried out utilizing a preheat time of 45 seconds, a mold time of 8 seconds, a sheet temperature of 171° C., a mold temperature of 182° C., a top oven temperature of 299° C., and a bottom oven temperature of 116° C. The trays prepared in this experiment were very satisfactory. In fact, they were determined to have an impact strength of $9.5 \times 10^4$ g . cm at a temperature of $-29°$ C. The trays made were also determined to have a crystallinity of 28%.

EXAMPLE 2

A PET resin having an intrinsic viscosity of 1.04 dl/g was extruder blended with Surlyn ®9720 (a polyethylene ionomer). Surlyn ®9721 has the same physical properties as Surlyn ® 9721 has the same 9720 is offered for wire and cable applications and contains a stabilizer which is not present in Surlyn ®9721. The thermoplastic resin composition made contained about 97% PET and 3% polyethylene ionomer. The resin was extruded utilizing an extruder which was operated at a temperature within the range of about 268° C. to about 288° C. utilizing an extruder speed of 86 rpm and a die temperature of about 284° C. The extruder screw produced sufficient shearing force to homogeneously blend the polyethylene ionomer into the PET. Sheeting having a thickness of 0.076 cm (0.03 inches) was prepared utilizing a chill roll temperature of about 74° C. and a take up speed of about 121.9 cm/minutes (4 feet/minute). The sheeting made was then thermoformed into trays utilizing a standard thermoformer. The thermoforming process was carried out utilizing a preheat time of 45 seconds, a mold time of 8 seconds, a sheet temperature of 171° C., a mold temperature of 182° C., a top oven temperature of 299° C. and a bottom oven temperature of 116° C. The trays made were determined to have an impact strength of $7.9 \times 10^4$ g cm at a temperature of $-29°$ C. The trays made were also determined to have a crystallinity of about 32%.

EXAMPLE 3 (COMPARATIVE)

In this experiment trays were prepared utilizing essentially the same procedure as was described in Example 2, except that linear low density polyethylene was substituted for the Surlyn ®9720. The trays made in this experiment were satisfactory. However, the trays made in this experiment did not possess the outstanding low temperature impact strength exhibited in the trays made in Examples 1 and 2. In this experiment the trays made utilizing 3% linear low density polyethylene only have a low temperature impact strength as measured at $-29°$ C. of $7.1 \times 10^4$ g . cm. Accordingly, the trays made in Example 1 utilizing Surlyn ®9721 had 35% more low temperature impact strength than did the trays made utilizing linear low density polyethylene. The trays made in Example 2 utilizing Surlyn ®9720 had 12% better low temperature impact strength than did the trays made in Example 3 which utilized linear low density polyethylene. This experiment shows that the low temperature impact strength of dual-ovenable trays can be greatly improved by utilizing polyethylene ionomers in the thermoplastic composition used in thermoforming the trays.

EXAMPLE 4

In this experiment dual-ovenable trays were prepared by thermoforming a sheet having a thickness of 0.076 cm which was comprised of a thermoplastic composition which contained about 97% PET having an intrinsic viscosity of 0.95 dl/g, about 3% Surlyn ®9721 and about 0.6% Ethanox ™ 330 (a stabilizer). The dual-ovenable trays made in this experiment exhibited a low temperature impact strength at $-29°$ C. of $9.7 \times 10^4$ g . cm. This is a 63% improvement in impact strength over dual-ovenable trays which are made utilizing similar compositions which contain linear low density polyethylene in lieu of the polyethylene ionomer utilized in this experiment. More specifically, dual-ovenable trays which were made utilizing linear low density polyethylene in lieu of the Surlyn ®9721 exhibited low temperature impact strengths as measured at $-29°$ C. of only $6.0 \times 10^4$ g . cm. This experiment, again, shows the superiority in low temperature impact strength of dual-ovenable trays which are made utilizing polyethylene ionomers.

While certain representative embodiments and details have been shown for the purpose of illustrating this invention, it will be apparent to those persons skilled in this art that various changes and modifications can be made therein without departing from the scope of this invention.

What is claimed is:

1. A thermoformed, non-oriented, heat set, thin walled article, comprising: (a) from about 92 to about 99 weight percent polyethylene terephthalate having an intrinsic viscosity of at least about 0.7 dl/g as measured in a 60:40 phenol/tetrachloroethane mixed solvent system at 30° C.; and (b) from about 1 to about 8 weight percent of a polyethylene ionomer having a melt flow index as measured using ASTM Method D-1238 of less than about 2 g/10 minutes; said article having a total crystallinity of from about 10% to about 40%.

2. A thermoformed, non-oriented, heat set, thin walled article as specified in claim 1 which is comprised of from about 94 weight percent to about 98.5 weight percent PET and from about 1.5 weight percent to about 6 weight percent polyethylene ionomer.

3. A thermoformed, non-oriented, heat set, thin walled article as specified in claim 2 which is further comprised of an effective amount of a heat stabilizer, wherein the effective amount of heat stabilizer is within the range of about 0.005 percent by weight to about 2 percent by weight, and wherein the polyethylene terephthalate has an intrinsic viscosity which is within the range of about 0.8 dl/g to about 1.4 dl/g.

4. A thermoformed, non-oriented, heat set, thin walled article as specified in claim 3 wherein said polyethylene ionomer has an impact strength as measured at 23° C. using ASTM Method D-1822S of at least about 1150 KJ/m².

5. A thermoformed, non-oriented, heat set, thin walled article as specified in claim 5 which has a crystallinity of between 15 and 40%.

6. A thermoformed, non-oriented, heat set, thin walled article as specified in claim 5 wherein the polyethylene ionomer is a copolymer of ethylene and methacrylic acid which is from about 5% to about 90% neutralized with at least one metallic cation having a valence of 1 to 3.

7. A thermoformed, non-oriented, heat set, thin walled article as specified in claim 6 wherein the polyethylene ionomer has a melt flow index of less than about 1.5 g/10 minutes 8. A thermoformed, non-oriented, heat set, thin walled article as specified in claim 6 wherein the polyethylene ionomer has a melt flow index of less than about 1.2 g/10 minutes.

9. A thermoformed, non-oriented, heat set, thin walled article as specified in claim 7 wherein the polyethylene ionomer is a terpolymer of ethylene, acrylic acid and sodium acrylate.

10. A thermoformed, non-oriented, heat set, thin walled article as specified in claim 7 wherein the polyethylene ionomer is a polymer which contains from about 3 weight percent to about 20 weight percent $\alpha,\beta$-ethylenically unsaturated carboxylic acids and from about 80 weight percent to about 97 weight percent ethylene.

11. A thermoformed, non-oriented, heat set, thin walled article as specified in claim 2 wherein the polyethylene terephthalate has an intrinsic viscosity of at least about 0.9 dl/g.

12. A thermoformed, non-oriented, heat set, thin walled article as specified in claim 2 wherein the polyethylene ionomer has an impact strength as measured at 23° C. of at least about 1200 KJ/m².

13. A thermoformed, non-oriented, heat set, thin walled article as specified in claim 6 wherein the polyethylene terephthalate is polyethylene terephthalate homopolymer.

14. A thermoformed, non-oriented, heat set, thin walled article as specified in claim 6 wherein the article has a crystallinity which is within the range of about 25% to about 35%.

15. A thermoformed, non-oriented, heat set, thin walled article as specified in claim 1 wherein said article is in the form of a dual-ovenable tray.

16. A thermoformed, non-oriented, heat set, thin walled article as specified in claim 6 wherein said article is comprised of from about 96 weight percent to about 98 weight percent polyethylene terephthalate and from about 2 weight percent to about 4 weight percent of the polyethylene ionomer.

* * * * *